June 25, 1935. W. L. CHEWNING 2,006,295
APPARATUS FOR THE SCRUBBING OF GAS
Filed June 19, 1931 6 Sheets-Sheet 1

WITNESS:

INVENTOR
Walter L. Chewning
BY
Augustus B. Broughton
ATTORNEY.

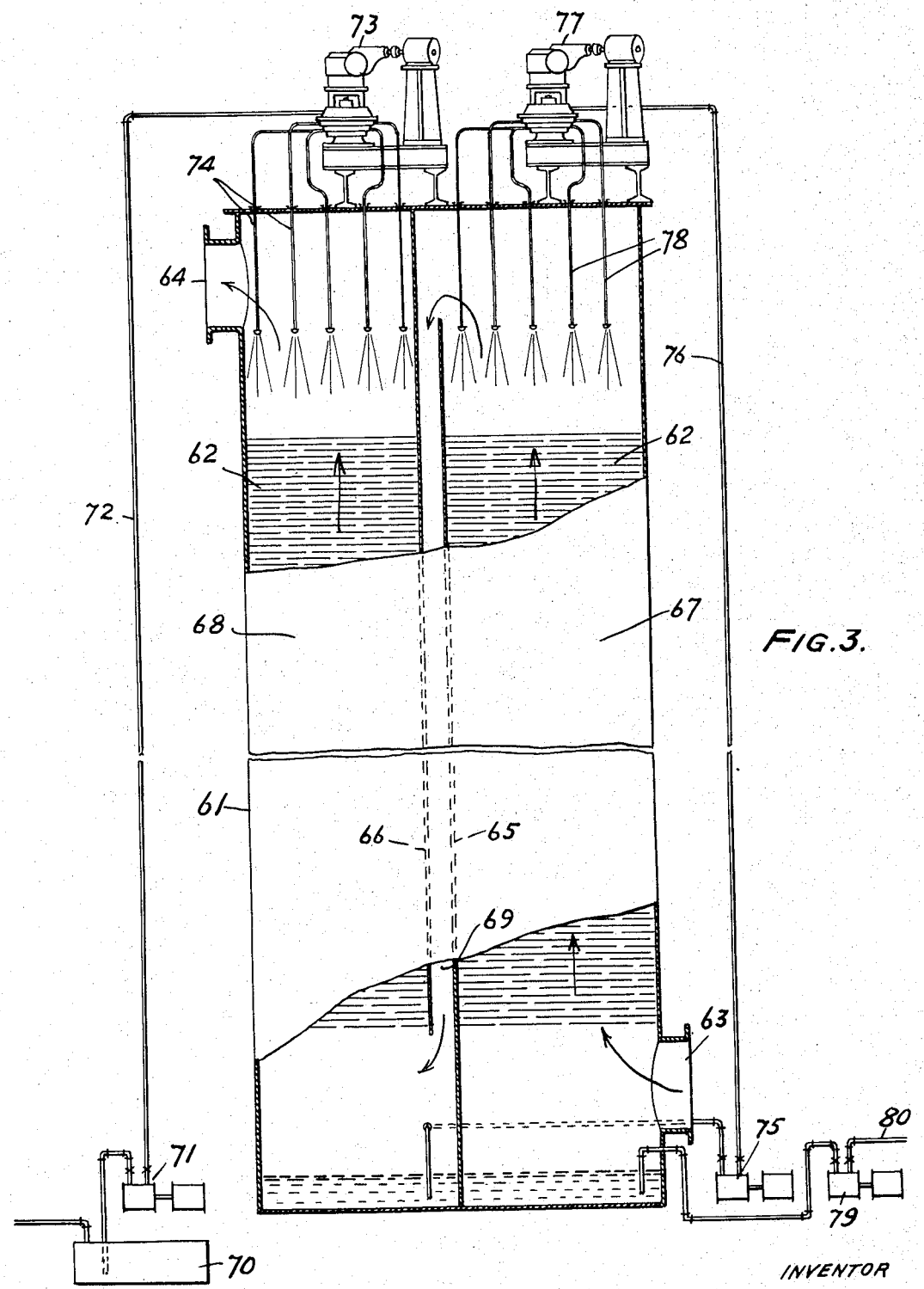

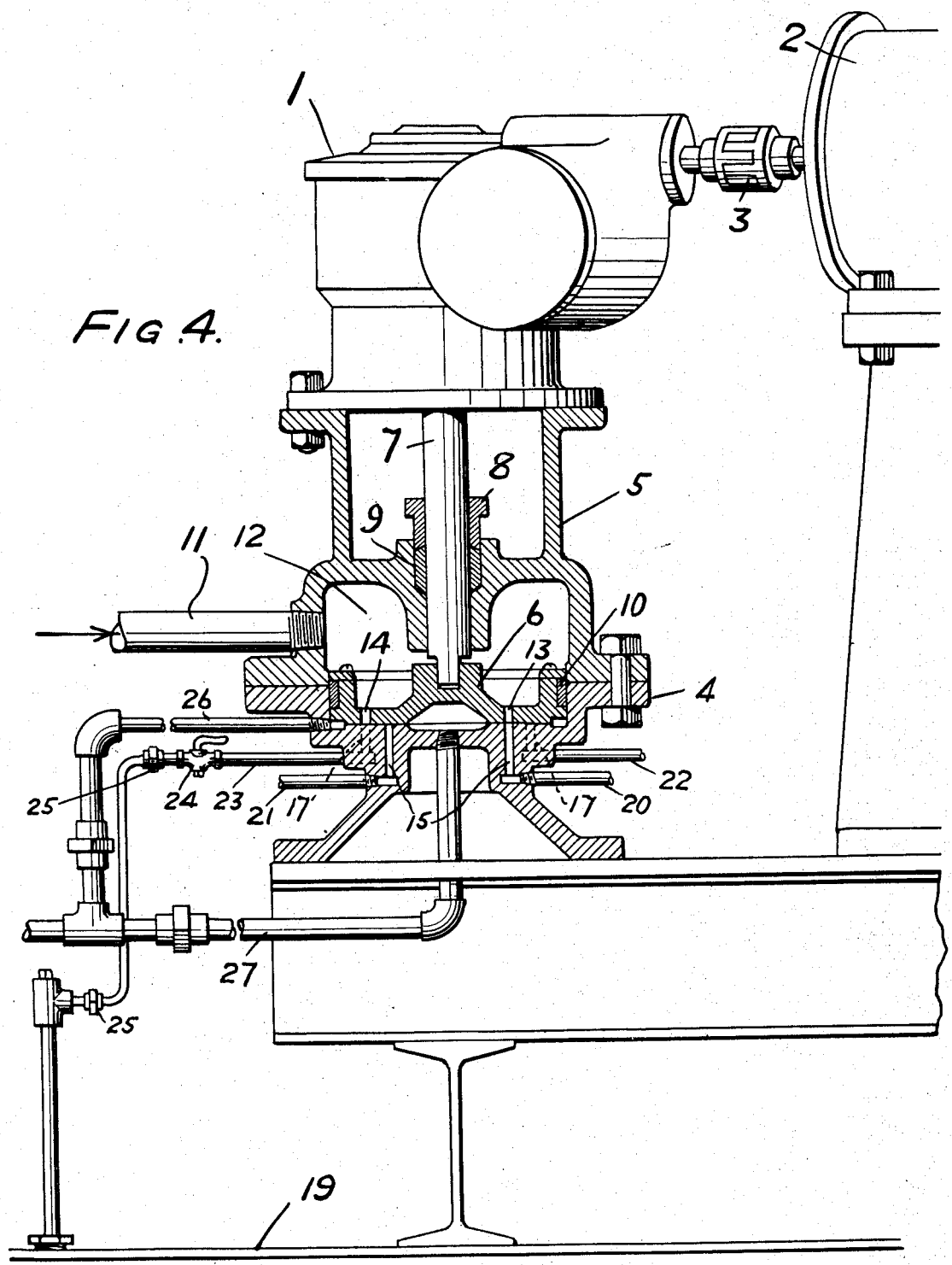

June 25, 1935.　　　W. L. CHEWNING　　　2,006,295
APPARATUS FOR THE SCRUBBING OF GAS
Filed June 19, 1931　　　6 Sheets-Sheet 4

WITNESS:

INVENTOR
Walter L. Chewning
BY
Augustus B. Stoughton
ATTORNEY.

June 25, 1935.  W. L. CHEWNING  2,006,295

APPARATUS FOR THE SCRUBBING OF GAS

Filed June 19, 1931   6 Sheets—Sheet 6

WITNESS:

INVENTOR
Walter L. Chewning
BY
Augustus B. Stoughton
ATTORNEY.

Patented June 25, 1935

2,006,295

UNITED STATES PATENT OFFICE 2,006,295

APPARATUS FOR THE SCRUBBING OF GAS

Walter L. Chewning, Cynwyd, Pa., assignor to United Engineers & Constructors Inc., Philadelphia, Pa., a corporation of Delaware Application June 19, 1931, Serial No. 545,469

4 Claims. (Cl. 261—98)

The present invention relates to an apparatus for the scrubbing of gas with a scrubbing medium to remove impurities from the gas or to recover certain constituents of the gas.

The invention is particularly adapted for use in instances in which it is desired to scrub the gas with a relatively small quantity of scrubbing medium as compared with the quantity of gas treated.

An example of such an instance is the scrubbing of manufactured gas with oil to remove naphthalene from the gas by absorption in the oil.

The quantity of naphthalene in manufactured gas varies in accordance with the kind of gas manufactured and in accordance with the particular methods of operation during manufacture. However, the quantity of naphthalene contained is relatively small. For instance, prior to purification for naphthalene, the naphthalene concentration in carburetted water gas may be from 10 to 15 grains per 100 cubic feet of gas and to reduce this concentration to the desired extent, say to 3 grains or below, requires only from 40 to 60 gallons of oil per million cubic feet of gas.

Securing efficient contact between the relatively large volume of gas and the relatively small volume of scrubbing oil in a tower scrubber is somewhat difficult. A plurality of sprays is required to secure proper distribution of the oil to the top of the tower packing, which may be grids, trays, Raschig rings, or other well known expedients.

The small quantity of oil passed per unit of time through each spray requires sprays of small size, which in practice frequently stop up reducing the efficiency of the apparatus and permitting the gas to leave the scrubber insufficiently purified.

The principal object of the present invention is to provide an apparatus for scrubbing which obviates this difficulty.

In general the method of the present invention comprises passing the gas to be treated through a scrubber containing a packing in counterflow relation to the scrubbing medium which is continuously sprayed onto the packing but which is sprayed intermittently onto different portions thereof.

To carry out this method I provide a scrubber with suitable packing such as wooden grids, trays, etc. having a gas inlet at its base and a gas outlet in its upper portion, means for delivering the scrubbing medium continuously to a distributor arranged to spray the scrubbing medium continuously onto the packing, but intermittently and periodically onto different portions of the packing.

By supplying different portions of the packing with the scrubbing medium intermittently, the quantity of scrubbing medium required for that portion of the packing is delivered in a relatively short time as compared with spraying continuously onto that portion of the packing and the spray delivering the scrubbing medium as well as the supply piping to the spray may be made sufficiently large to greatly lessen dangers of stoppage, and are easier to clean out, as, for instance, by steam should stoppage occur.

I may effect this distribution of the scrubbing medium intermittently and periodically onto different portions of the scrubber packing in various ways. I may provide a plurality of stationary sprays arranged above the packing, which are supplied by a distributor which successively supplies the scrubbing medium to one spray after another, terminating the admission of the scrubbing medium to one spray after another, terminating the admission of the scrubbing medium through one spray, on establishing the delivery through the succeeding spray, together with means to supply the scrubbing medium continuously to the distributing means.

Or I may distribute the scrubbing medium by providing movable sprays which due to their motion spray intermittently and periodically onto the different portions of the scrubber packing. For instance, if the scrubber is a cylindrical tower the sprays may revolve continuously about the axis of the scrubber at varying distances from the axis, or the motion may be reciprocating.

I may also combine the moving sprays with distributing means which feed the scrubbing medium intermittently and periodically to the individual sprays.

In any case the intermittent supply of the scrubbing medium to different portions of the packing permits a higher rate of supply through individual sprays and permits the employment of larger sprays and piping with decreased danger of stoppage. The continuous supply of scrubbing medium to the distributor permits the continuous and steady operation of the scrubbing medium pumps which is very desirable, besides requiring smaller pumps than would be required if the delivery of scrubbing medium to the scrubber as a whole were intermittent.

The invention will be described in connection with the attached figures which form a part of this specification and in which, Figure 1 shows in partial elevation and partial vertical cross section one form of scrubber arranged according to the present invention.

Figure 3 shows in partial elevation and partial vertical cross section a modification of the scrubber of Figure 1, in which the scrubber is divided into two sections arranged side by side.

Figure 4 shows in partial elevation and partial vertical section one form of the distributing means which forms a part of this invention.

The figures are described in connection with the use of the apparatus of the invention for the purification of gas from naphthalene by scrubbing with oil.

Figure 1:
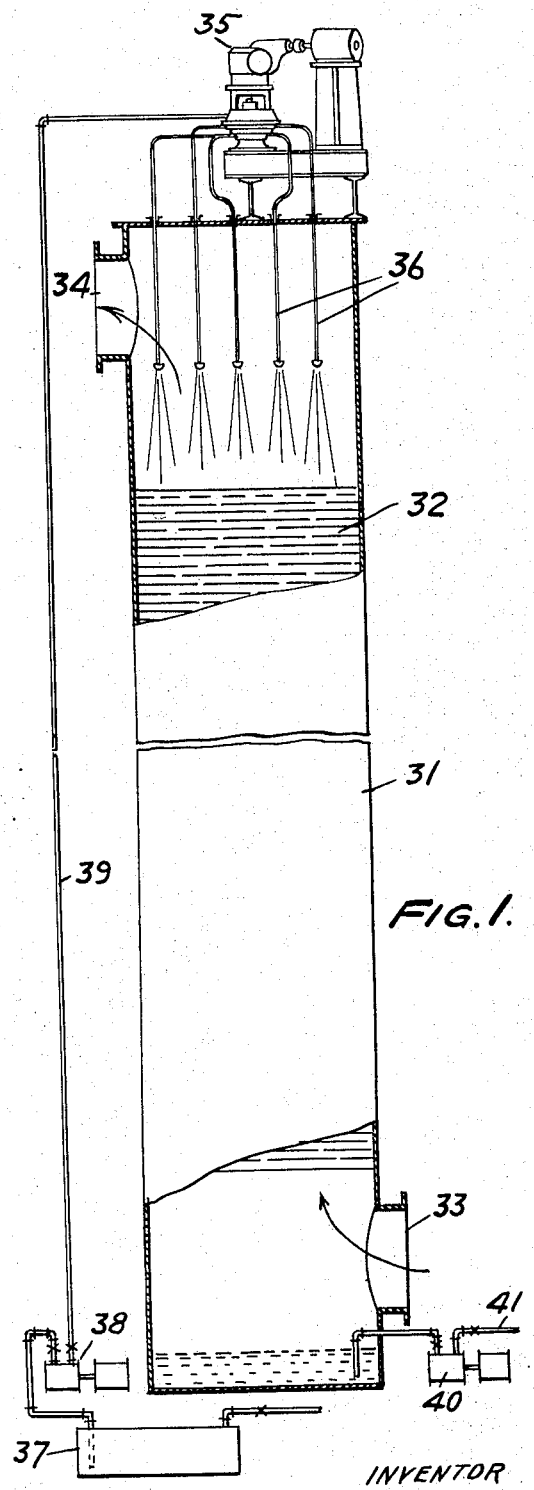

Referring to Figure 1, 31 generally indicates the scrubber, which is provided with packing as for instance the grids indicated at 32. 33 is the gas inlet at the base of the scrubber and 34 is the gas outlet at its top. The scrubber is provided with the distributor generally indicated at 35 for distributing the scrubbing oil successively to individual sprays 36 within the top of the scrubber.

Fresh scrubbing oil is supplied to the distributor from the storage tank 37 by means of the pump 38 and the line 39.

Fouled scrubbing oil is removed from the base of the scrubber by pump 40. The discharge line 41 from the pump goes to waste or to means for revivifying the fouled oil or to other disposal.

The particular form of distributor illustrated at 35 is described in detail in connection with Figure 4. In general it operates to feed oil continuously to the scrubber, but intermittently to each of a plurality of sprays within the scrubber, connecting one spray after another with the oil supply line and terminating the oil admission to each spray as the admission of oil to the next spray is established.

The distributor illustrated is typical of means for supplying oil continuously to the scrubber packing when considered as a whole but intermittently to different portions of scrubber packing, operating to successively wet successive portions of the packing.

In operation of the scrubber, the gas to be purified enters at 33 and passes upward through the scrubber coming in contact with the packing surfaces which are wetted with the scrubbing oil, the oil absorbing the naphthalene from the gas. The gas with its naphthalene content reduced to the desired quantity passes off through the outlet 34. The pump 38 delivers the fresh scrubbing oil continuously to the distributor 35, which delivers the oil to one after another of the sprays 36, so that fresh oil is continually supplied to the packing 32, but successive portions are intermittently drenched with the oil.

The spent oil with the increasing quantities of absorbed naphthalene drips downward through the packing, and collects in the base of the scrubber from which it passes to waste or to means for driving off its naphthalene content fitting it for reuse or to other disposal.

Figure 2:
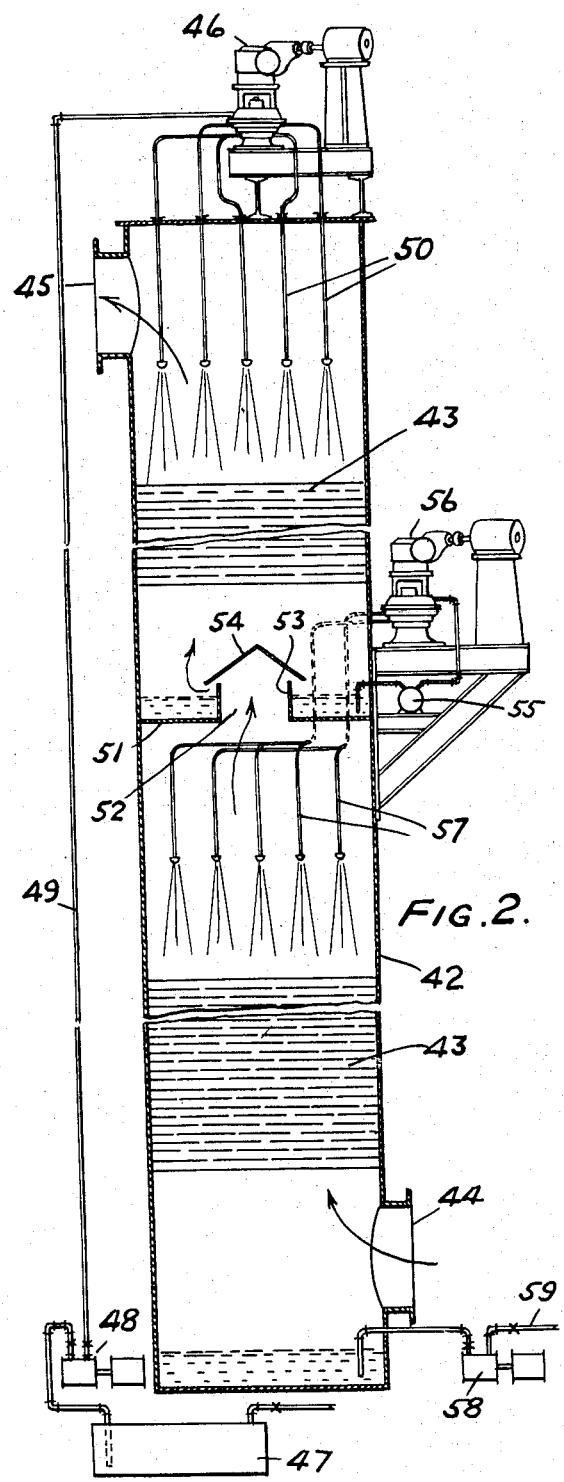
Figure 2 shows in vertical cross section a modification of the scrubber of Figure 1, in which the scrubber is divided into two sections one superimposed on the other.

Referring to Figure 2,

In the operation of the apparatus illustrated in Figure 1 there is some danger of improper distribution of the scrubbing oil in the lower portion of the scrubber. It may channel to some extent leaving portions of the packing insufficiently wetted.

For that reason I prefer to redistribute the oil after it has passed through a portion of the packing.

Figure 2 illustrates one form of apparatus in which this redistribution is provided.

42 generally indicates the scrubber. 43 indicates scrubber packing, grids are diagrammatically illustrated. 44 is the gas inlet. 45 is the gas outlet. 46 indicates a distributor as generally described in connection with Figure 1. Fresh oil is supplied to the distributor from storage 47 by means of pump 48 and line 49.

The distributor feeds oil successively to one after another of the plurality of sprays 50 arranged in the upper portion of the scrubber above the packing.

The scrubber is divided by the transverse partition 51, which is perforated to provide the gas passage 52 which is provided with the upstanding rim 53 and the hood 54. The rim 53 and the shell of the scrubber provide a basin for the collection of partially fouled scrubbing oil on the partition 51.

Pump 55 draws oil which collects above the partition and feeds it to distributor 56, which is similar to distributor 46, but which is provided with the plurality of sprays 57, arranged within the scrubber below the partition 51.

Spent oil collecting in the base of the scrubber is delivered by pump 58 and line 59 to waste revivification or other disposal.

In operation of the apparatus of Figure 2 gas to be purified enters at 44 and flows upward through the packing and across its wetted surfaces in counterflow relation to the flow of the scrubbing oil, which absorbs naphthalene from the gas. The gas passes through the partition 52 and under the hood 54 and resumes its upward passage through the packing, leaving the scrubber through the outlet 45, with its naphthalene content reduced to the desired extent.

Fresh oil is supplied continuously by pump 48 to the distributor 46 which supplies the oil continuously to the top of the scrubber but intermittently to the individual sprays 50, drenching intermittently successive portions of the packing. The oil drips down through the packing in the upper portion of the scrubber and collects above the partition 51. From here it is removed by the pump 55 and supplied to the distributor 56 which redistributes it to the packing in the lower portion of the scrubber below the partition 51, successively drenching portions of the packing below the partition and insuring the even distribution of the oil through the lower portion of the packing.

The spent oil collects in the base of the scrubber and is removed by pump 58, through line 59 to waste, revivification or other disposal.

Referring to Figure 3. This figure shows another arrangement of the apparatus of the invention to effect a redistribution of the scrubbing oil after passing part way through the scrubber. In this figure the two sections of the scrubber are placed side by side instead of one on top of the other as in Figure 2.

61 generally indicates the scrubber, which is provided as before with packing indicated at 62. 63 is the gas inlet, 64 is the gas outlet. The scrubber is divided vertically by partitions 65 and 66 into two packed sections 67 and 68 with a gas passage 69 between them.

Fresh oil is supplied from storage 70 by pump 71 through line 72 to the distributor 73, which supplies oil continuously to the top of the packing in section 68 but intermittently and successively to individual sprays 74 arranged above the packing, drenching intermittently successive portions of the packing.

Pump 75 removes partially fouled oil from the base of section 68 and supplies it by line 76 to the distributor 77 which is similar to distributor 73 and which continuously redistributes the oil to the top of the packing in section 67 but intermittently as to the individual sprays 78.

The spent oil is removed from the base of section 67 by pump 79 and delivered through line 80 to waste, revivification or other disposal.

The gas to be purified enters at 63 and passes up through the packing in section 67, down through the gas passage 69 and up through the packing in section 68. Naphthalene is progressively absorbed by the oil from the gas as the two pass in counterflow relation through the two sections. The gas freed of napthalene to the desired extent passes off through outlet 64.

Figure 6:
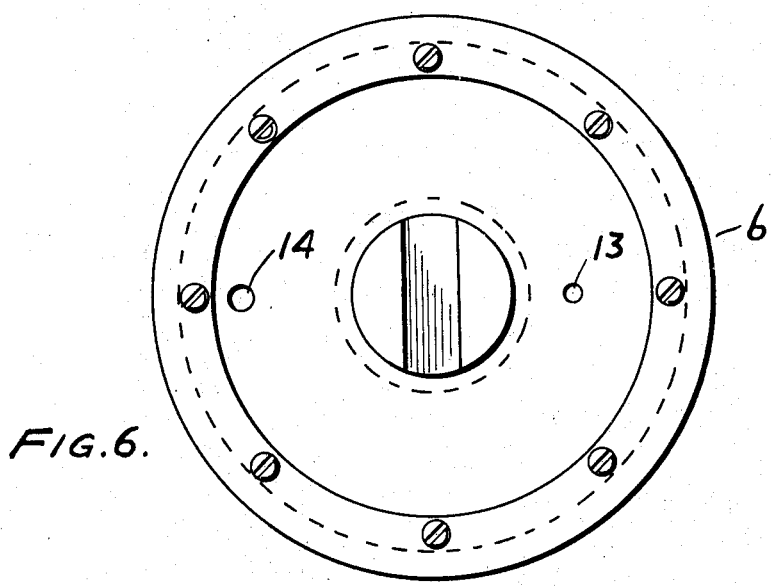
Figure 6 shows a plan view of the disk of the distributor of Figure 4.
Figure 5:
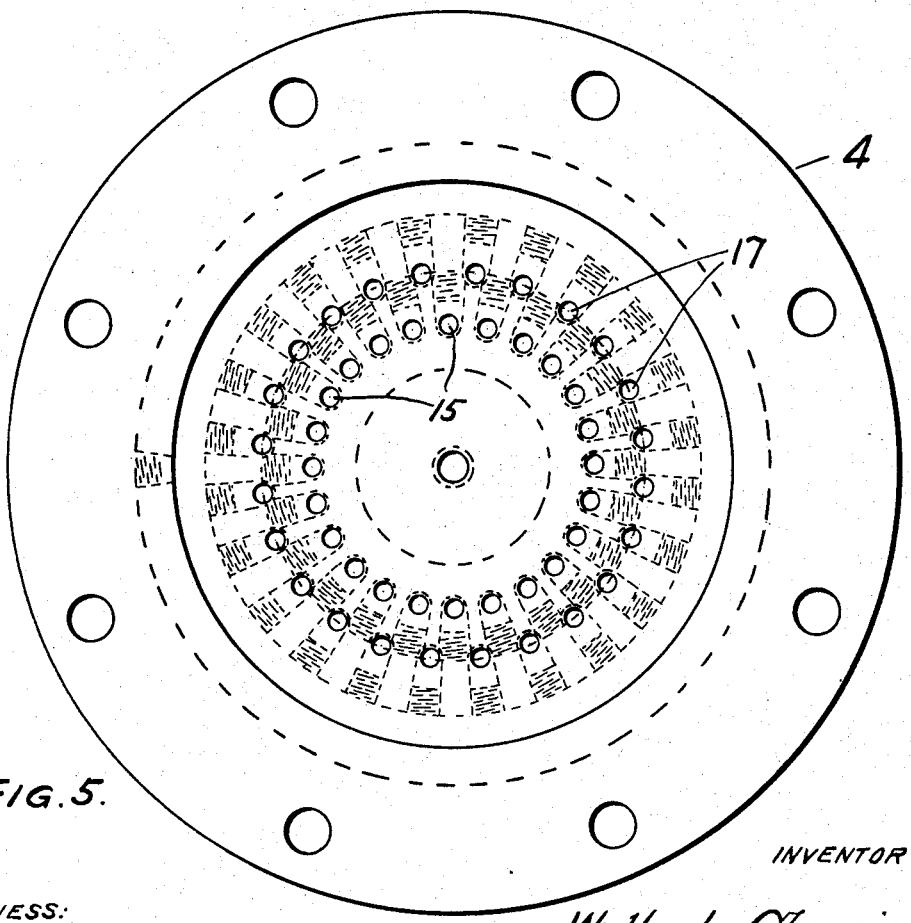
Figure 5 shows a plan view of the base of the distributor of Figure 4.

Referring to Figures 4, 5 and 6. 1 indicates a reduction gear speed reducer, 2 is an enclosed explosion proof motor, 3 is a flexible coupling between the motor and the reduction gear, 4 is the base of the distributor, 5 is the distributor housing, and 6 is the distributor disk. The distributor disk 6 is driven by the slow speed shaft 7 of the reducing gear 1. 8 is a stuffing box between the shaft 7 and the housing 5 provided with packing 9. 10 indicates a packing of felt or other suitable material between the disk 6 and housing 5 and base 4. 11 is the oil inlet to the distributor supplying oil under pressure to the chamber 12 within the housing 5. The disk 6 is provided with an inner port 13 and an outer port 14 which register with the ports of an inner and outer series of ports in the base 4 as the disk revolves on shaft 7. The inner and outer ports of the base are staggered so that the inner port of the disk registers with an inner port of the base, then the outer port of the disk with an outer port of the base and so on. The ports are arranged so that one port of the base is opened as another is closed and oil flows continuously from the chamber 12 through the base but intermittently as to each port of the base and alternately as to the ports of the disk. 15 indicates inner ports in the base while 17 indicates outer ports. In Figure 4 port 13 of the disk is shown registered with port 15 of the base.

A pipe provided with a spray head leads from each port in the base into the scrubber. The top of the scrubber is shown at 19. 20 and 21 are pipes leading from inner ports, 22 and 23 are pipes leading from outer ports. Each pipe may be provided with a cock as shown at 24 and unions indicated at 25 to permit the pipe to be shut off and repaired or removed during operation. Oil which is carried between the surfaces of the disk and the base and which lubricates the surfaces is drained from small chambers through pipes 26 and 27 back to the fresh oil storage.

The outer port of the disk is preferably slightly larger than the inner port because of its greater linear velocity as the disk rotates.

Figure 7:
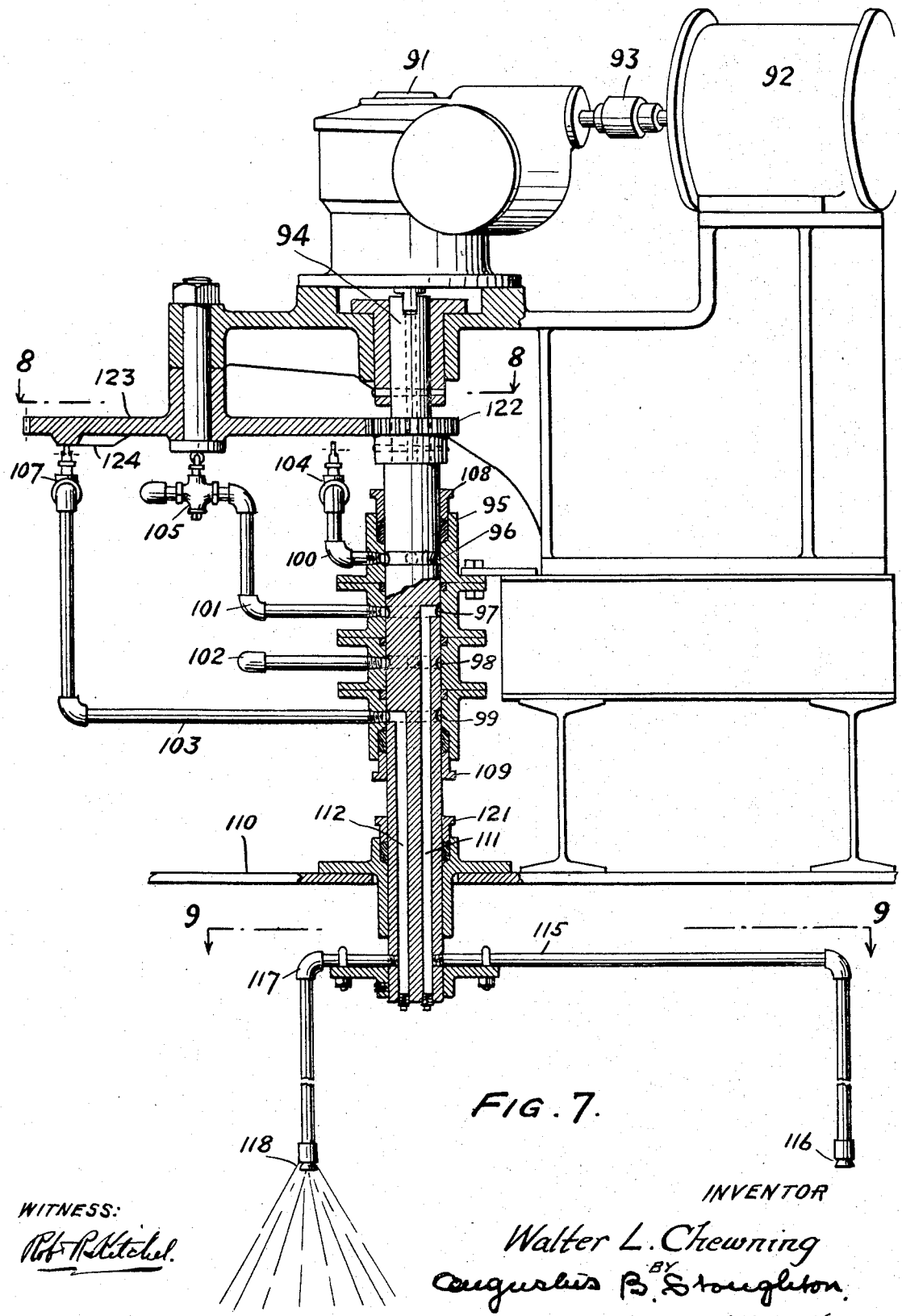
Figure 7 shows in partial elevation and partial vertical cross section another form of distributor with moving sprays and intermittent feed to individual sprays.
Figure 8:
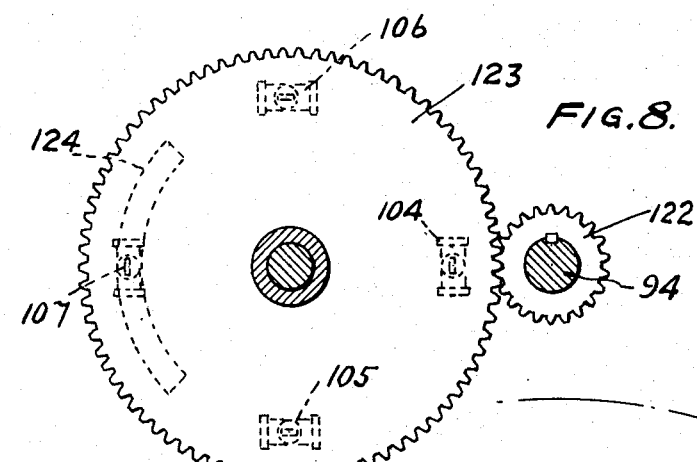
Figure 8 shows a horizontal cross section along the line 8—8 in Figure 7.
Figure 9:
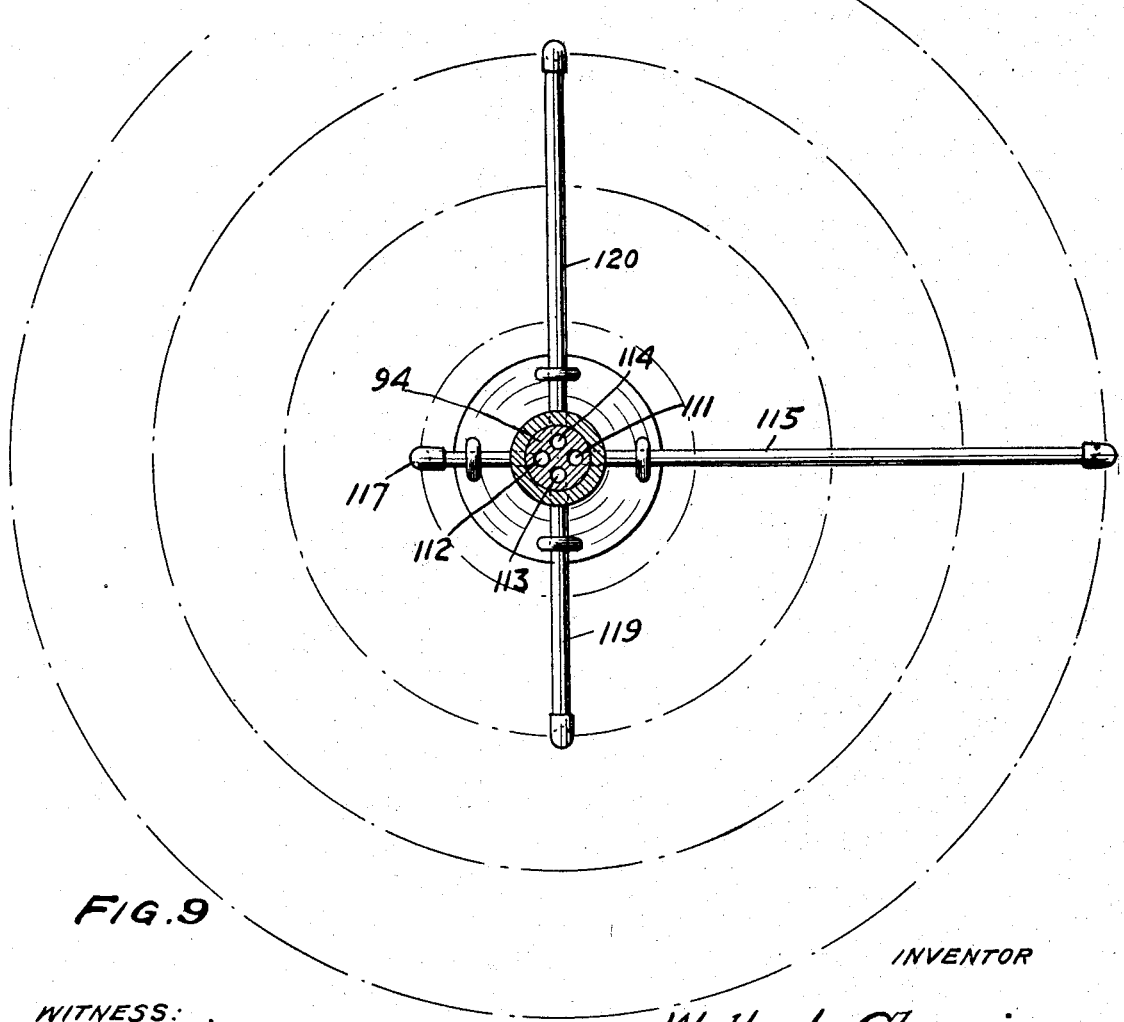
Figure 9 shows a horizontal cross section along the line 9—9 in Figure 7.

Referring to Figures 7, 8 and 9. These figures illustrate another form of the distributor of my invention. 91 indicates a reduction gear, 92 is an enclosed explosion proof motor. Shaft 94 is an extension of the slow speed shaft of the reduction gear, which rotates within the stationary sleeve 95. Shaft 94 within the sleeve is provided with a plurality of annular grooves—four are shown for illustration—and are indicated at 96, 97, 98 and 99. Each groove is fed by a corresponding oil inlet pipe as for instance pipes 100, 101, 102 and 103. Each inlet pipe is provided with a valve as indicated at 104, 105, 106 and 107.

108 and 109 indicate stuffing boxes between the shaft 94 and the sleeve 95. The shaft extends through the top of the scrubber indicated at 110. Each groove in the shaft connects with a corresponding channel in the shaft, for instance groove 97 is shown provided with channel 111, groove 99 with channel 112, groove 98 connects with channel 113 and groove 96 with channel 114.

Each channel is provided with an outlet pipe within the scrubber which is fitted with a spray head, as for instance outlet 115 provided with spray head 116 is connected to channel 111 and through the channel to groove 97 and oil inlet 101; and outlet 117; provided with spray head 118, connected to channel 112, groove 99 and oil inlet 103. In like manner outlet 119 is connected to channel 114. 121 indicates a stuffing box between the shaft 94 and the scrubber top.

The shaft 94 is provided with the gear 122 which drives the larger gear 123, the gear ratio for example may be one to four.

The gear 123 is provided with the cam 124, which as the gear 123 rotates, engages and operates the valve 104, 105, 107 and 106 successively, as these valves are arranged in the path of the cam.

In operation the motor 92 drives the shaft 94 through the coupling 93 and the reduction gear 91, rotating the shaft and the outlet pipes and their sprays within the scrubber. The gear 122 revolves with the shaft 94, driving the cam gear 123. The cam engages and operates the valves successively and admits oil successively through each valve and thence through the corresponding oil inlet in the sleeve, groove and channel in the shaft to the individual outlet pipe and spray, which sprays oil into the scrubber as the shaft and spray revolve as long as the cam engages the valve. As the cam disengages one valve that valve shuts off and the cam engages the next admitting oil through another spray and so on. With a gear ratio between gears 122 and 123 of 1 to 4, the shaft 94 revolves 4 times while gear 123 revolves once. A spray is supplied with oil during, for instance, the first quarter of one revolution, the second quarter of the second revolution, the third quarter of the third revolution and the fourth quarter of the fourth revolution.

Oil is supplied continuously to the holder but intermittently as to individual sprays and as to individual portions of the scrubber packing which is arranged beneath the sprays, drenching individual portions of the packing intermittently.

In Figures 7 and 8 for instance cam 124 has opened valve 107 and oil is passing through inlet 103, groove 99, channel 112, outlet 117 and spray 118 into the scrubber.

The outlet pipes are of varying lengths so that the individual sprays sweep paths of different radii. Sufficient sprays are provided to reach all portions of the top of the scrubber packing.

Another modification consists in using a distributor of the type shown in Figs. 7 and 8 by locating the stationary pipes 100, 101, 102 and 103 so that they lead directly into the top of the scrubber in the same way as the pipes 26 in Fig. 1. The pipes 100, 101, 102 and 103, in such a modification, terminate in sprays or spray heads similar to sprays 50, 57, 78 or 116 and 118.

The apparatus provides for a continuous supply of oil to the scrubber with the intermittent drenching of successive portions of the scrubber packing.

I do not intend to be limited in the practice of my invention save as the scope of the prior art and of the attached claims may require.

I claim:

1. Apparatus for scrubbing gas with a liquid including a scrubber having gas inlet and outlet means therein, a plurality of liquid supply means, a plurality of rotatable liquid inlet means to said scrubber receiving liquid from said supply means, means in each of said supply means for controlling the flow of liquid therethrough, and means for intermittently opening and closing said means for controlling the flow of liquid through the supply means.

2. Apparatus for scrubbing gas with a liquid including a scrubber, gas inlet means near the base of said scrubber, gas outlet means near the top of said scrubber, a plurality of liquid supply means, a plurality of rotatable sprays for introducing liquid to the upper portion of said scrubber, a valve in each of said liquid supply means, a cam for intermittently opening and closing selected ones of said valves so that liquid is introduced intermittently to parts of said scrubber, and means for removing spent liquid from the lower portion of said scrubber.

3. Apparatus for scrubbing gas with liquid including a scrubber, gas inlet means adjacent the bottom of said scrubber, gas outlet means adjacent the top of said scrubber, liquid supply means for said scrubber, a plurality of liquid inlet means to the upper portion of said scrubber, means for continuously supplying liquid from said supply means to certain ones of said inlet means so that liquid is intermittently supplied to portions of said scrubber, a reservoir for collecting liquid intermediate of said scrubber, a plurality of liquid inlet means for introducing liquid to said scrubber beneath said reservoir, means for continuously withdrawing liquid from said reservoir and supplying it to certain ones of said second mentioned inlet means so that liquid is intermittently supplied to portions of the lower part of said scrubber, and means for withdrawing spent liquid from the lower portion of said scrubber.

4. Apparatus for scrubbing gas with liquid, which apparatus comprises: a scrubber having gas inlet and gas outlet means therein, and liquid supply means for continuously supplying liquid under pressure to said scrubber, said liquid supply means comprising, a source of liquid, a pump for applying pressure to liquid from said source, a distributor connected to said pump, a plurality of liquid inlet means in said scrubber each connected to said distributor, distribution means in said distributor and having a plurality of openings therein so that communication is continuously open between said pump and at least one of said liquid inlet means, and a continuously rotating motor operating said distribution means continuously.

WALTER L. CHEWNING.